Patented Jan. 12, 1937

2,067,469

UNITED STATES PATENT OFFICE 2,067,469

ACID WOOL DYESTUFFS OF THE ANTHRAQUINONE SERIES

Klaus Weinand, Leverkusen-I. G. Werk, and Curt Bamberger, Cologne-Mulheim, Germany, assignors to General Aniline Works, Inc., New York, N. Y., a corporation of Delaware No Drawing. Application August 30, 1935, Serial No. 38,662. In Germany September 14, 1934

5 Claims. (Cl. 260—60)

The present invention relates to new acid wool dyestuffs of the anthraquinone series.

In accordance with our present invention new acid wool dyestuffs of the anthraquinone series are obtained by causing aliphatic, hydroaromatic or aromatic amines to react upon 1-amino-4-halogenanthraquinone-2-sulfonic acids which have a sulfonamide group in a β-position of the other nucleus. Mixed aliphatic-aromatic amines of the type of benzylamine are intended to fall within the scope of the term "aliphatic amine". Our new dyestuffs are manufactured in the usual manner, for instance, by working in an aqueous alkaline medium while using copper salts as catalysts.

The new dyestuffs which are obtainable in accordance with our present invention may be represented by the following formula:

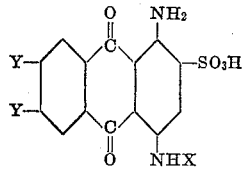

wherein X stands for an aliphatic, hydroaromatic or aromatic residue, one Y stands for a sulfonamide group and the other Y stands for hydrogen. It is to be understood that the hydrogen atoms of the sulfonamide group may be substituted by alkyl-, aryl- or hydroaryl groups, lower alkyl groups being preferably employed. These new dyestuffs are dissolved in water with a vivid blue to bluish-green coloration and dye wool from an acid bath blue to bluish-green shades of excellent fastness to light. The dyestuffs show particularly good equalizing properties.

The following examples illustrate the invention without restricting it thereto the parts being by weight:—

Example 1

10 parts of the sodium salt of 1-amino-4-bromo-6-sulfodiethylamidoanthraquinone-2-sulfonic acid, 300 parts of a 10% solution of methylamine, 5 parts of sodium carbonate and 0.5 part of copper sulfate are heated on the water bath for 2 hours. The solution being at first red gradually turns to greenish-blue. After blowing off the excess of the methylamine with steam the 1-amino-4-methylamino-6-sulfo-diethylamino-anthraquinone-2-sulfonic acid formed is separated with sodium chloride in a crystalline form. It is soluble in water with a vivid blue shade and dyes wool from an acid bath clear blue shades.

Example 2

5 parts of the sodium salt of 1-amino-4-bromo-7-sulfomethylamidoanthraquinone-2-sulfonic acid are heated to boiling for 1½ hours while stirring with 20 parts of aniline and the addition of 5 parts of sodium carbonate and 0.3 part of copper sulfate in 100 parts of water. After cooling the dyestuff-1-amino-4-anilido-7-sulfomethylamidoanthraquinone-2-sulfonic acid separates in needles. It is soluble in water with a blue coloration and dyes wool from an acid bath greenish-blue shades.

Example 3

10 parts of 1-amino-4-bromo-6-(dimethyl)-sulfonamidoanthraquinone-2-sulfonic acid are boiled for two hours with 30 parts of hexahydroaniline in the presence of 450 parts of water and 50 parts of alcohol with the addition of 6 parts of sodium carbonate and 0.5 part of copper sulfate. The alcohol and the excess of hexahydroaniline are removed from the reaction mixture by blowing in steam. From the remaining solution the dyestuff is salted out by the addition of sodium chloride. It forms blue needles, which are soluble in water with a clear greenish-blue coloration and dye wool from an acid bath greenish-blue shades of excellent fastness properties.

Example 4

10 parts of 1-amino-4-bromo-6-(dimethyl)-sulfonamidoanthraquinone-2-sulfonic acid are heated for 4-6 hours to a temperature of 60-80° C. with 8 parts of para-aminoacetanilide with the addition of 10 parts of sodium bicarbonate and 0.5 part of copper chloride in 100 parts of water. After cooling the dyestuff formed is filtered by suction and recrystallized from water. It forms bluish-green needles, which dissolve in water with a bluish-green coloration and dye wool from an acid bath very fast, bluish-green shades.

We claim:—

1. The products of the formula

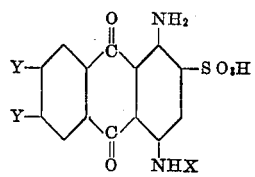

wherein X stands for an organic radical selected from the group consisting of aliphatic, hydroaromatic and aromatic radicals, one Y stands for an alkyl sulfonamide group and the other Y stands for hydrogen.

2. The products of the formula

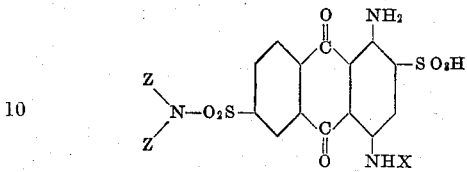

wherein X stands for an organic radical selected from the group consisting of aliphatic, hydroaromatic and aromatic radicals and each Z stands for an alkyl group.

3. The products of the formula

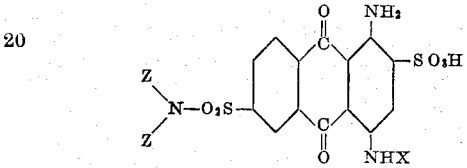

wherein X stands for an aromatic radical and each Z stands for a lower alkyl group.

4. The product of the formula

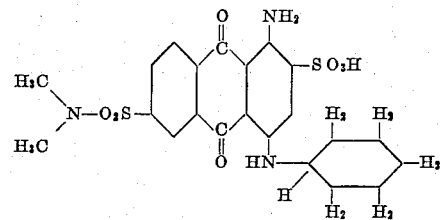

5. The product of the formula

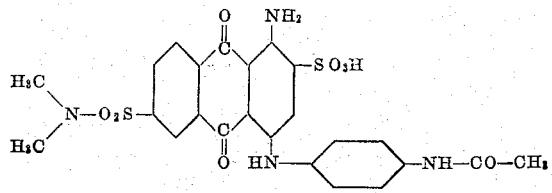

KLAUS WEINAND.
CURT BAMBERGER.